United States Patent
Quenu et al.

(10) Patent No.: US 12,129,793 B2
(45) Date of Patent: Oct. 29, 2024

(54) MANUFACTURE OF AN AIR INLET LIP OR RING SECTOR OF AN AIR INLET LIP INCORPORATING OPENINGS WITH TURNED-IN EDGES

(71) Applicant: SAFRAN NACELLES, Gonfreville-l'Orcher (FR)

(72) Inventors: Fabienne Quenu, Moissy-Cramayel (FR); Vincent Dutot, Moissy-Cramayel (FR); Bertrand Pierre Martin Leroyer, Moissy-Cramayel (FR); François Taillard, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/249,394

(22) PCT Filed: Oct. 20, 2021

(86) PCT No.: PCT/FR2021/051833
§ 371 (c)(1),
(2) Date: Apr. 18, 2023

(87) PCT Pub. No.: WO2022/084629
PCT Pub. Date: Apr. 28, 2022

(65) Prior Publication Data
US 2023/0287835 A1    Sep. 14, 2023

(30) Foreign Application Priority Data
Oct. 21, 2020 (FR) ...................................... 2010782

(51) Int. Cl.
F02C 7/04    (2006.01)

(52) U.S. Cl.
CPC ............ *F02C 7/04* (2013.01); *F05D 2230/25* (2013.01)

(58) Field of Classification Search
CPC .... F02C 7/00; F02C 7/04; F02C 7/042; F02C 7/05; F02C 7/055; F02C 7/057;
(Continued)

(56) References Cited

U.S. PATENT DOCUMENTS

| 5,000,399 A | * | 3/1991 | Readnour | B64D 33/02 |
| | | | | 244/130 |
| 7,334,447 B1 | * | 2/2008 | Kulkarni | B21D 22/24 |
| | | | | 72/347 |

(Continued)

FOREIGN PATENT DOCUMENTS

| CN | 102149489 A | 8/2011 |
| CN | 102658327 A | 9/2012 |

(Continued)

OTHER PUBLICATIONS

French Search Report issued in French Application No. 2010782, issued on Jul. 7, 2021 (2 pages).

(Continued)

*Primary Examiner* — Hung Q Nguyen
*Assistant Examiner* — Anthony Donald Taylor, Jr.
(74) *Attorney, Agent, or Firm* — Bookoff McAndrews, PLLC (57) ABSTRACT

The disclosure relates to a method for manufacturing an air intake lip comprising: the arrangement of a blank facing a three-dimensional forming surface of a die of a hydroforming tool, the forming of an air intake lip preform by hydroforming the blank on the three-dimensional surface of the die, the air intake lip preform having in section a U-shape, the outer wall of the air intake lip comprising at least one hollow housing with an inturned edge and a (Continued)

bottom, the housing having a shape corresponding to the shape of the at least one opening cavity, the cutting of an opening in each hollow housing keeping at least the inturned edge so as to obtain an air intake lip comprising at least one opening having an edge integrally formed with the outer wall of the lip.

9 Claims, 10 Drawing Sheets

(58) Field of Classification Search
CPC ..... F05D 2230/25; B64D 29/00; B64D 29/06; B64D 7/02; B64D 5/12; F02F 3/12; F02F 3/14; B21D 26/033
USPC ...................................................... 415/182.1
See application file for complete search history.

(56) References Cited

U.S. PATENT DOCUMENTS

| | | | | |
|---|---|---|---|---|
| 8,152,461 | B2* | 4/2012 | Howarth | B64D 29/00 415/213.1 |
| 8,197,191 | B2* | 6/2012 | Binks | B64D 29/08 415/214.1 |
| 10,676,203 | B2* | 6/2020 | Porte | B64F 5/40 |
| 2004/0050908 | A1* | 3/2004 | Kendall | B21D 22/16 228/112.1 |
| 2004/0226333 | A1* | 11/2004 | Kato | B21D 22/16 72/68 |
| 2005/0120766 | A1 | 6/2005 | Friedman et al. | |
| 2005/0269443 | A1* | 12/2005 | Porte | F01D 21/04 244/53 B |
| 2007/0186612 | A1* | 8/2007 | Stewart | B21D 25/02 72/302 |
| 2008/0016844 | A1* | 1/2008 | Shutrump | F02K 3/02 60/226.1 |
| 2011/0162429 | A1* | 7/2011 | Leacock | B21D 25/04 72/296 |
| 2013/0266448 | A1* | 10/2013 | Blin | B64D 33/02 416/219 R |
| 2015/0260104 | A1* | 9/2015 | Wilson | F02C 7/20 29/888 |
| 2015/0367395 | A1* | 12/2015 | Ludlow | B21D 25/04 72/352 |
| 2017/0107905 | A1* | 4/2017 | Brown | B23K 20/122 |
| 2018/0127108 | A1* | 5/2018 | Lebeda | F02C 7/04 |
| 2018/0201387 | A1* | 7/2018 | Porte | F02C 7/045 |
| 2018/0236526 | A1* | 8/2018 | Ludlow | B21D 25/02 |
| 2018/0339783 | A1* | 11/2018 | Leon | B64D 33/02 |
| 2020/0102083 | A1* | 4/2020 | Sanz Martinez | B64C 7/02 |
| 2020/0246859 | A1* | 8/2020 | Douglas | B64F 5/10 |
| 2020/0353556 | A1* | 11/2020 | Leon | C22C 21/00 |

FOREIGN PATENT DOCUMENTS

| | | | |
|---|---|---|---|
| CN | 105073294 A | 11/2015 | |
| CN | 109234650 A | 1/2019 | |
| CN | 110697061 A | 1/2020 | |
| CN | 110899501 A * | 3/2020 | ........... B21D 35/002 |
| EP | 2918499 A1 | 9/2015 | |
| EP | 3406750 A1 | 11/2018 | |
| EP | 3594126 A1 | 1/2020 | |
| NL | 1042952 B1 | 2/2020 | |

OTHER PUBLICATIONS

International Search Report and Written Opinion issued in International Application No. PCT/FR021/051833 on Jan. 31, 2022 (18 pages).
First Notice of Examination and Search issued in corresponding Chinese Application No. CN202180071555, issued Jan. 17, 2024.

* cited by examiner

MANUFACTURE OF AN AIR INLET LIP OR RING SECTOR OF AN AIR INLET LIP INCORPORATING OPENINGS WITH TURNED-IN EDGES

CROSS-REFERENCE TO RELATED APPLICATIONS

This is a National Stage Application under 35 U.S.C. § 371 of International Application No. PCT/FR2021/051833, filed Oct. 20, 2021, now published as WO 2022/084629 A1, which claims priority to French Patent Application No. 2010782, filed on Oct. 21, 2020.

TECHNICAL FIELD

The present invention relates to the manufacture of air intake lips of aeronautical engine nacelles.

PRIOR ART

The nacelles of aeronautical engines include an air intake cowl extended at the front by a lip having in section a U-shape open towards the rear. The air intake lip has in particular the function of ensuring the aerodynamic flow of the air, on the one hand, towards the fan channel and, on the other hand, towards the outside of the nacelle.

The air intake lips are generally manufactured in one piece or from several individual annular sectors assembled together subsequently.

The air intake lips or annular sectors are individually manufactured by sheet metal forming and more specifically by spin forming. Once the air intake lip or the annular sector is manufactured, it is common to make openings by machining into the wall of the lip or of the sector, particularly to house and fix add-on parts there.

The machining of openings in the wall of the lip or of the annular sector after forming can entail so-called "laminarity" defects corresponding to a modification of the aerodynamic profile of the lip or of the sector which is liable to disturb the flow along the outer wall of the lip or of the lip sector.

Furthermore, when an add-on part is fixed at the level of an opening, the fixing members used protrude over the surface of the outer wall of the lip or of the sector, which also disrupts the flow along the outer wall of the lip or of the lip sector. However, there is a need for the manufacture of air intake lips or annular sectors of air intake lips including one or more openings which do not modify the aerodynamic profile of the lip or of the annular sector after forming.

DISCLOSURE OF THE INVENTION

To this end, the invention proposes a method for manufacturing an air intake lip or an air intake lip annular sector comprising:
  the arrangement of a blank facing a three-dimensional surface of a die of a hydroforming tool, the three-dimensional surface comprising an outer annular portion for forming the outer wall of an air intake lip or of an air intake lip annular sector, the outer annular portion comprising at least one opening cavity protruding over the three-dimensional surface,
  the forming of an air intake lip or an air intake lip sector by hydroforming the blank on the three-dimensional surface of the die, the air intake lip or the air intake lip annular sector preform having in section a U-shape, the outer wall of the air intake lip or of the air intake lip annular sector preform comprising at least one hollow housing with an inturned edge and a bottom, the housing having a shape corresponding to the shape of said at least one opening cavity,
  the cutting of an opening in each hollow housing, keeping at least the edge inturned in such a way as to obtain an air intake lip or an air intake lip annular sector comprising at least one opening having an edge integrally formed with the outer wall of said lip or of said sector.

Thus, owing to the method of the invention, each opening is made from a housing formed at the same time as the air intake lip or the air intake lip sector. The forming of the housing can therefore not modify the geometry and the aerodynamic profile of the outer wall when it is carried out simultaneously with the forming of the lip or of the sector. Furthermore, each housing extends under the outer wall. Consequently, each subsequent machining of the housing to form an opening has no impact on the geometry of the outer wall and therefore on the aerodynamic profile of the lip or of the sector.

According to one particular characteristic of the method of the invention, when cutting an opening in one or more hollow housings, only all or part of the inturned edge is kept. In this case, an add-on part can be fixed on the inturned edge of the opening of the hollow housing, said part extending under the outer wall of the air intake lip or of the air intake lip annular sector. The add-on part can in particular be a scoop.

According to another particular characteristic of the method of the invention, when cutting an opening in one or more hollow housings, a portion of the bottom of the hollow housing is kept in such a way as to form a plunging in the opening, the method further comprising the fixing of an add-on part onto the bottom of the housing, said part being present under the outer wall of the air intake lip or of the air intake lip annular sector or flush with the outer wall of the air intake lip or of the air intake lip annular sector.

According to another particular characteristic of the method of the invention, each opening cavity is mounted on a removable key. This in particular makes it possible to facilitate the unmolding of the lip or annular sector preform.

The object of the invention is also an air intake lip or air intake lip annular sector having in section a U-shape, the outer wall of the air intake lip or of the air intake lip annular sector comprising one or more openings, each opening including at least one inturned edge integrally formed with the outer wall and extending under said outer wall.

According to one particular characteristic of the air intake lip or of the air intake lip annular sector of the invention, an add-on part is fixed to the inturned edge of one or more openings present on the outer wall of the air intake lip or of the air intake lip annular sector, said part extending under the outer wall of the air intake lip or of the air intake lip annular sector.

According to another particular characteristic of the air intake lip or of the air intake lip annular sector of the invention, the add-on part is a scoop.

According to another particular characteristic of the air intake lip or of the air intake lip annular sector of the invention, one or more openings further include a plunging and an add-on part on the plunging, said part being present under the outer wall of the air intake lip or of the air intake lip annular sector or flush with the outer wall of the air intake lip or of the air intake lip annular sector.

DESCRIPTION OF THE EMBODIMENTS

The invention generally applies to the production of air intake lips or of annular sectors for air intake lips for aeronautical engine nacelles.

Figure 1:
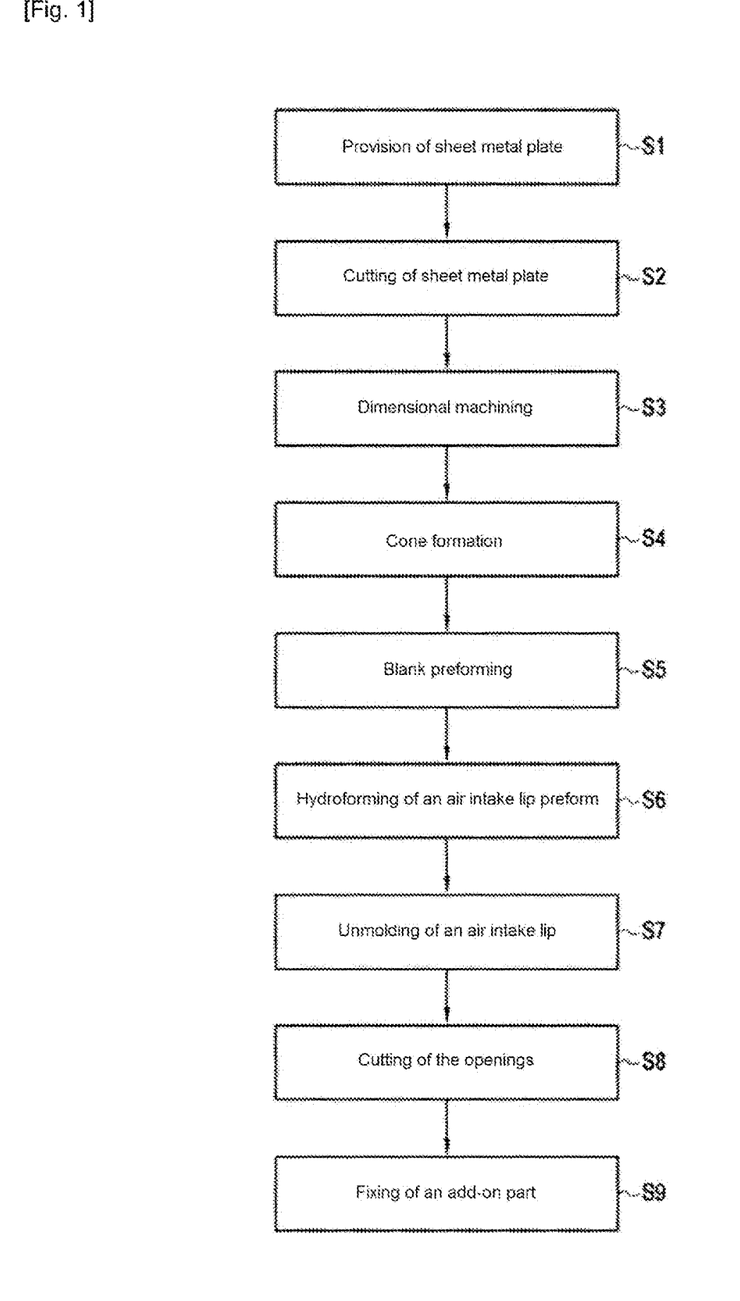
FIG. 1 is a flowchart showing the steps of a method for manufacturing an air intake lip in accordance with one embodiment of the invention.

FIG. 1 describes the steps of a method for manufacturing an air intake lip in accordance with the invention.

Figure 2:
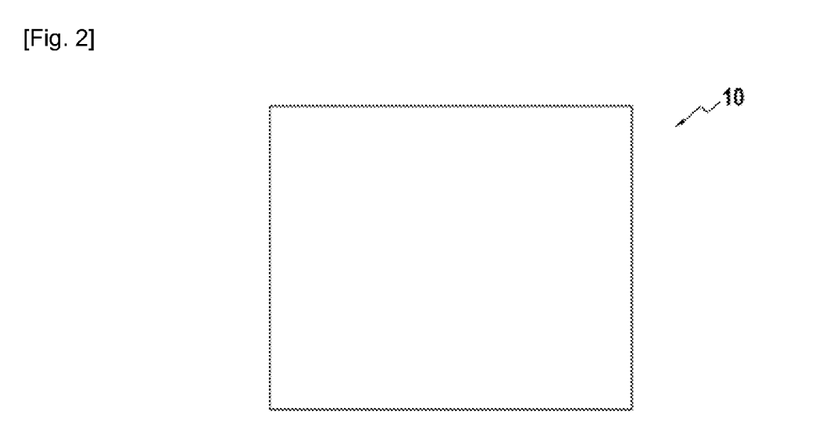
FIG. 2 is a schematic view of a sheet metal plate.

As illustrated in FIG. 2, the method begins with the provision of a sheet metal plate 10, for example made of aluminum alloy (step S1). The sheet metal 10 can be an integral plate or a plate obtained by assembling several plates fixed together by welding in order to obtain large-sized sheet metal plates from smaller unit sheet metal plates.

Figure 3:
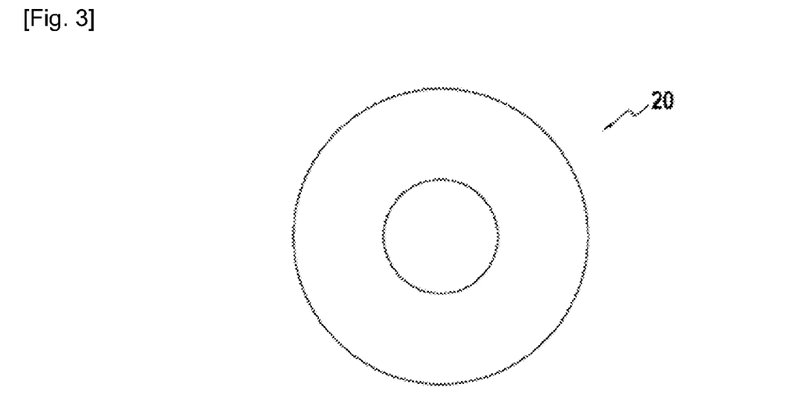
FIG. 3 is a diagram of a ring obtained after cutting the sheet metal plate of FIG. 1.

The sheet metal plate 10 is then cut to form a ring 20 illustrated in FIG. 3 (step S2).

The ring 20 is mechanically machined in thickness so as to obtain a constant sheet metal thickness after shaping (step S3).

Figure 4:
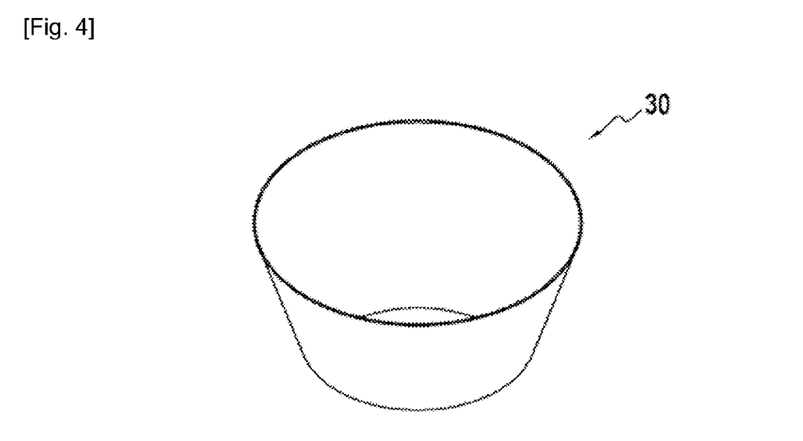
FIG. 4 is a schematic perspective view of a truncated cone obtained from the ring of FIG. 3.

A truncated cone 30 illustrated in FIG. 4 is then formed from the ring 20 by the known technique of the sheet metal rolling.

Figure 5:
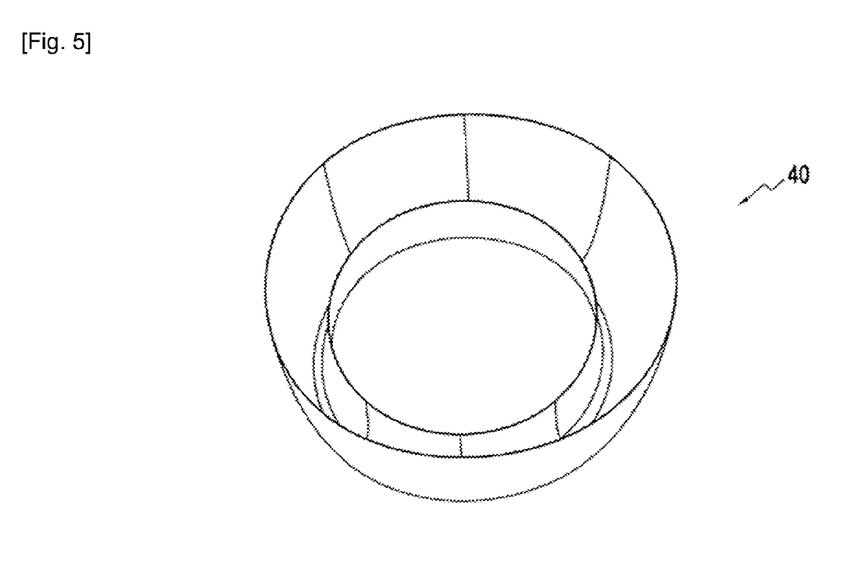
FIG. 5 is a schematic perspective view of an air intake lip blank obtained from the truncated cone of FIG. 4.

Once formed, the truncated cone 30 is preformed, for example by embossing and/or stamping, into a lip blank 40 having a general shape similar to that of the final lip, that is to say already having in section a U-shape as represented in FIG. 5 (step S5).

Figure 6:
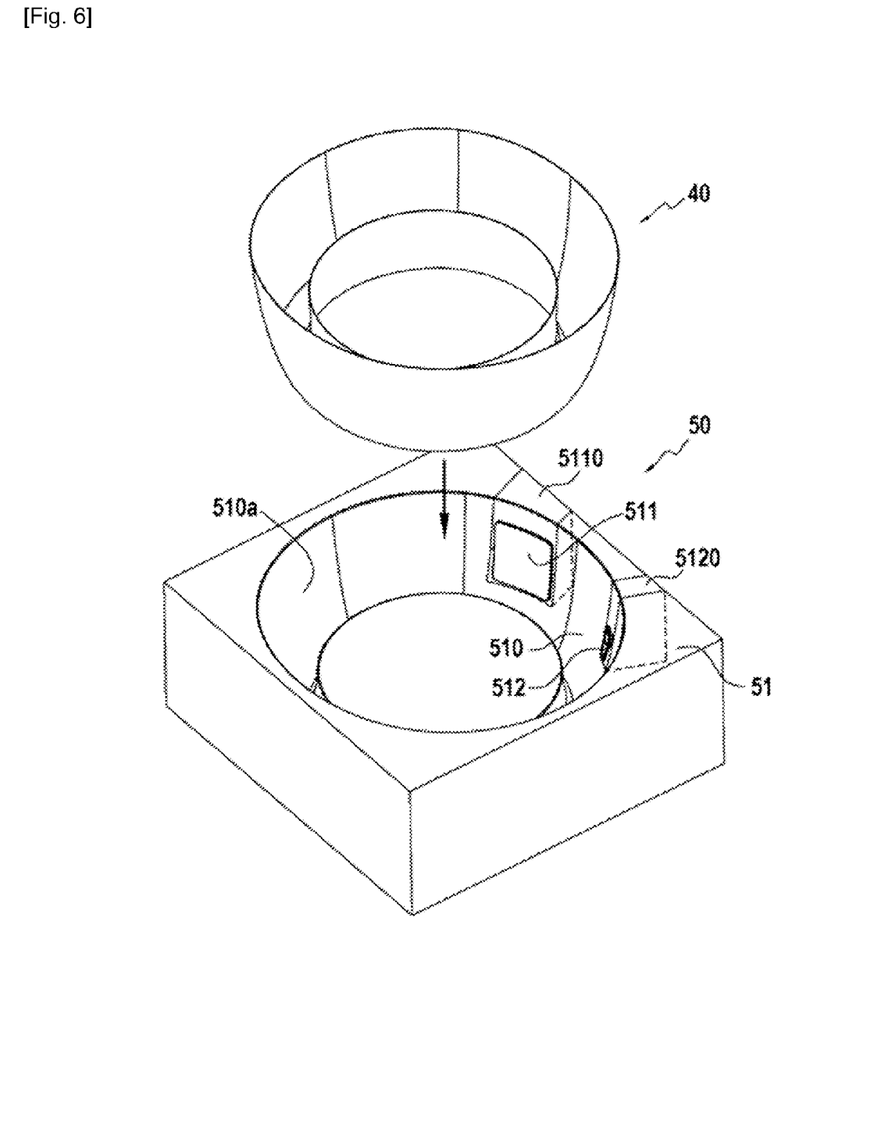
FIG. 6 is a schematic perspective view showing the arrangement of the blank of FIG. 5 in a hydroforming tool.
Figure 7:
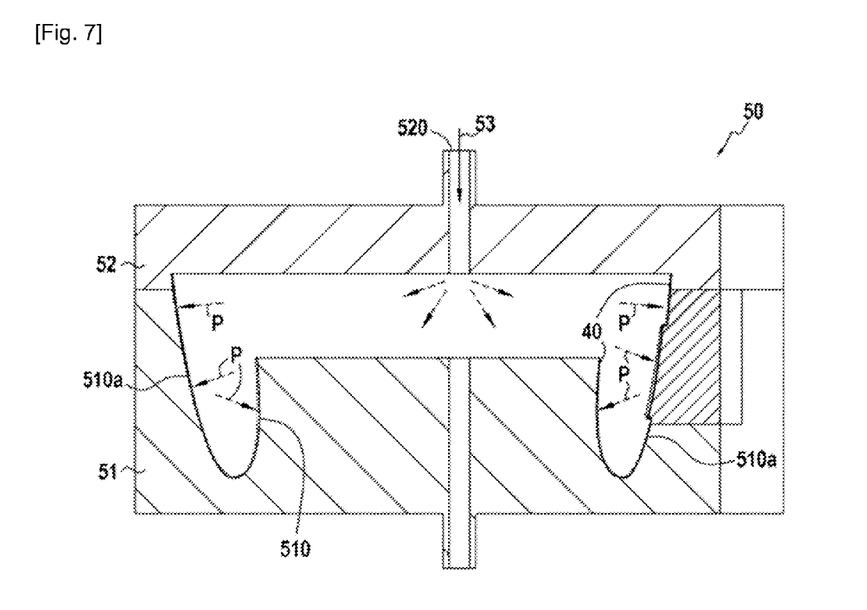
FIG. 7 is a schematic sectional view of the hydroforming tool of FIG. 6 once closed and in operation.

In accordance with the invention, the final shaping of an air intake lip is then carried out by hydroforming or internal high pressure forming (step S6). More precisely and as illustrated in FIG. 6, the blank 40 is arranged in a mold 51, also called die, of a hydroforming tool 50, the die 51 including a three-dimensional surface 510 corresponding to the shape of the lip preform to be obtained. The tool 51 is then hermetically closed by a lid 52 as illustrated in FIG. 7. The lid 52 includes an opening 520 through which a fluid 53 under high pressure is introduced. The high-pressure P of the fluid 53 exerted on the blank 40 forces the latter to take the shape of the three-dimensional surface 510 of the die 51. In the example described here, the three-dimensional surface 510 includes an outer annular portion 510a for forming the outer wall of an intake lip. The outer annular portion 510a includes two opening cavities 511 and 512 of different geometries. In the example described here, the cavity 511 is intended to allow the formation of a hollow housing for the incorporation of a cover on the air intake lip while the cavity 512 is intended to allow the formation of a hollow housing for the incorporation of an air outlet on the air intake lip. The opening cavities 511 and 512 are preferably respectively mounted on removable keys 5110 and 5120.

Figure 8:
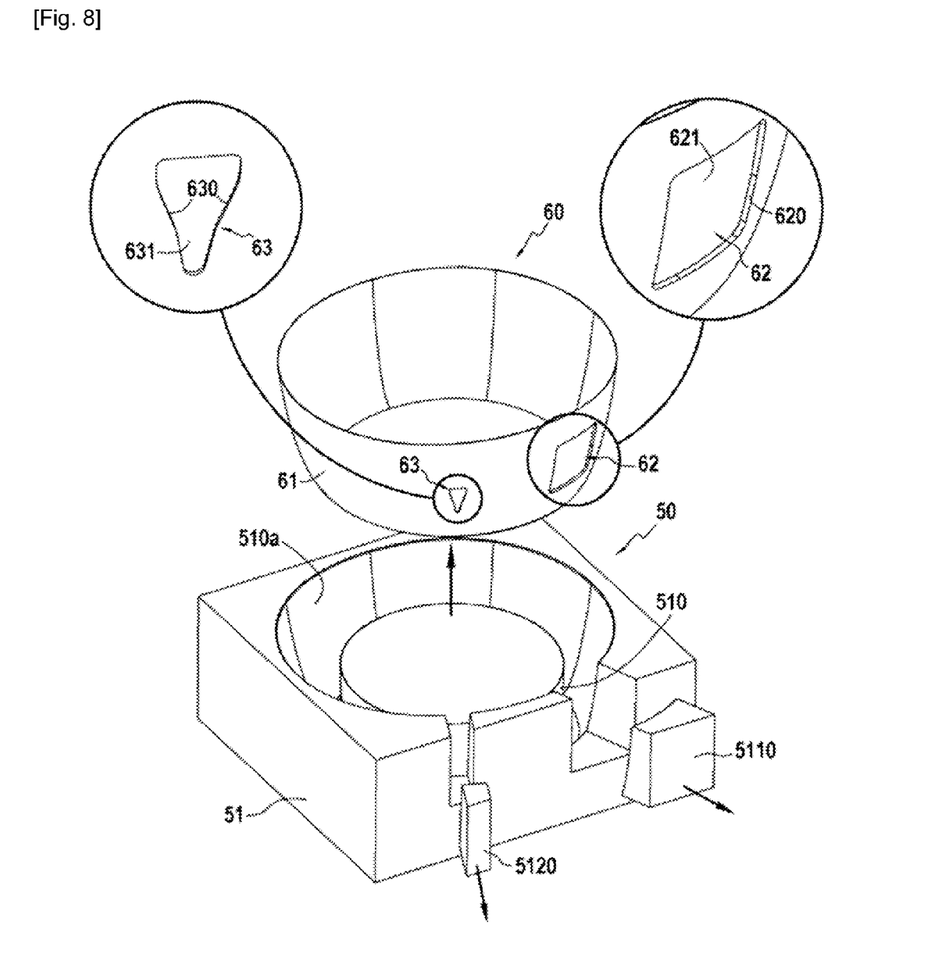
FIG. 8 is a schematic perspective view showing the unmolding of an air intake lip preform after hydroforming the blank of FIG. 5 in the hydroforming tool of FIGS. 6 and 7.

Once the hydroforming is complete, a one-piece air intake lip preform 60 having a shape of revolution having in section a U-shape. The air intake lip is then unmolded as shown in FIG. 8 (step S7). The opening cavities 511 and 512 being here mounted on removable keys 5110 and 5120, they can be removed to facilitate the unmolding of the lip after hydroforming.

At this stage, the air intake lip preform 60 already has the final geometry of the lip, in particular at the level of its outer wall 61 along which an air flow is intended to flow. It is therefore important to preserve the aerodynamic profile of the outer wall of the lip. As illustrated in the figure, the intake lip 60 further includes two hollow housings 62 and 63 on its outer wall 61 respectively formed by the cavities 511 and 512. The hollow housing 62 comprises an inturned edge 620 and a bottom 621 both extending under the outer wall 61. Similarly, the hollow housing 63 comprises an inturned edge 630 and a bottom 631 both extending under the outer wall 61.

Figure 9:
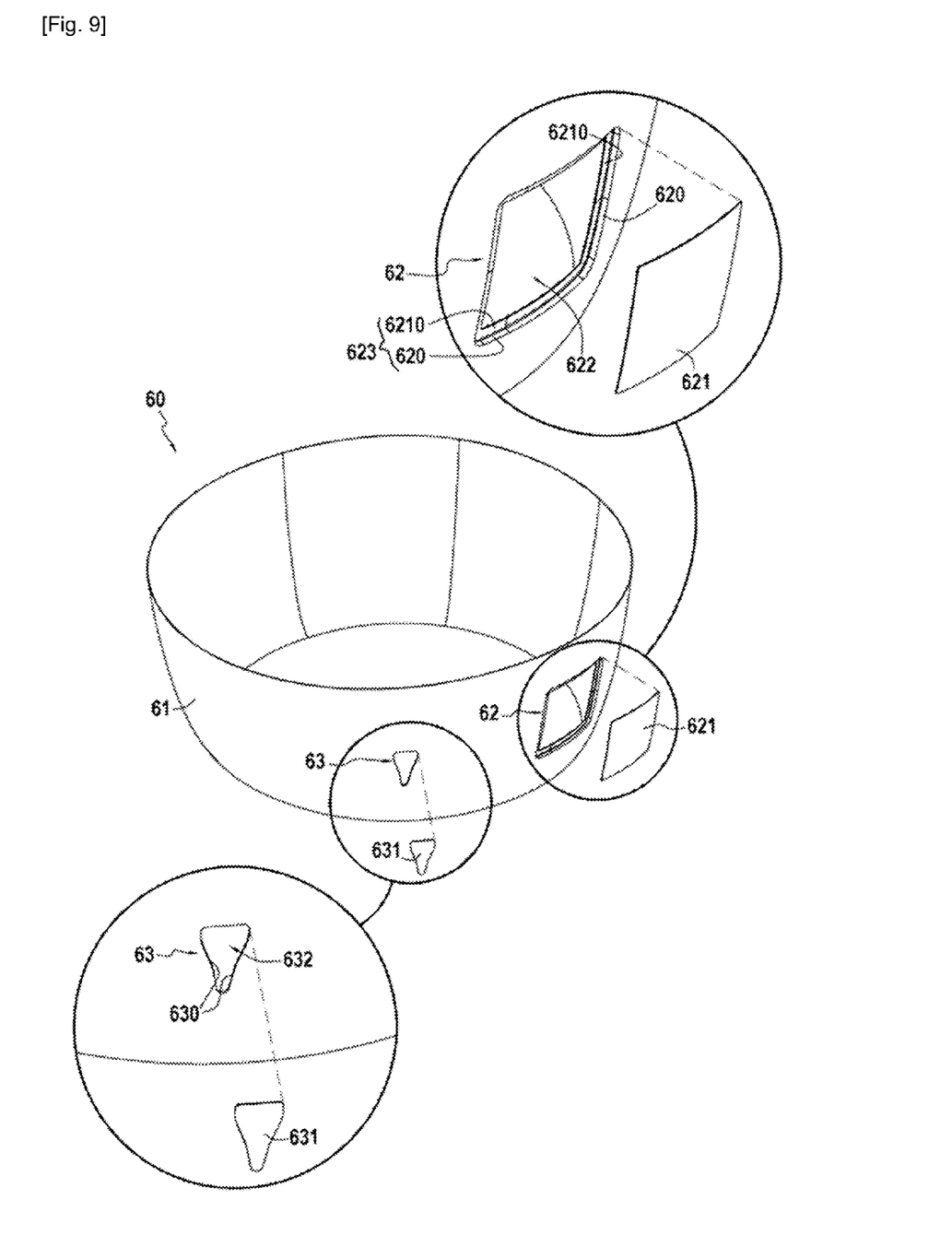
FIG. 9 is a perspective view showing the cutting of openings in the lip preform of FIG. 8.

Next, an opening is cut in each of the hollow housings 62 and 63 (step S8). As illustrated in FIG. 9, an opening 622 is made in the bottom 621 of the hollow housing 62, for example by machining. In the example described here, the bottom 621 is not entirely removed in order to leave a portion 6210 and form a plunging 623 corresponding to the inturned edge 620 and to the portion 6210 both integrally formed with the rest of the air intake lip preform. An opening 632 is also made in the hollow housing 63. In the example described here, the bottom 631 is entirely removed in order to keep only the inturned edge 630.

If the bottom of a hollow housing is entirely removed, all or part of the inturned edge is kept according to the fixing requirements. One may for example remove only the bottom and keep the entire inturned edge. One may also remove a part of the inturned edge in such a way as to adjust the depth of extension of the edge under the outer wall of the lip as needed, or even dispense with an entire part of the inturned edge, for example on one or more sides of the hollow housing.

Figure 10:
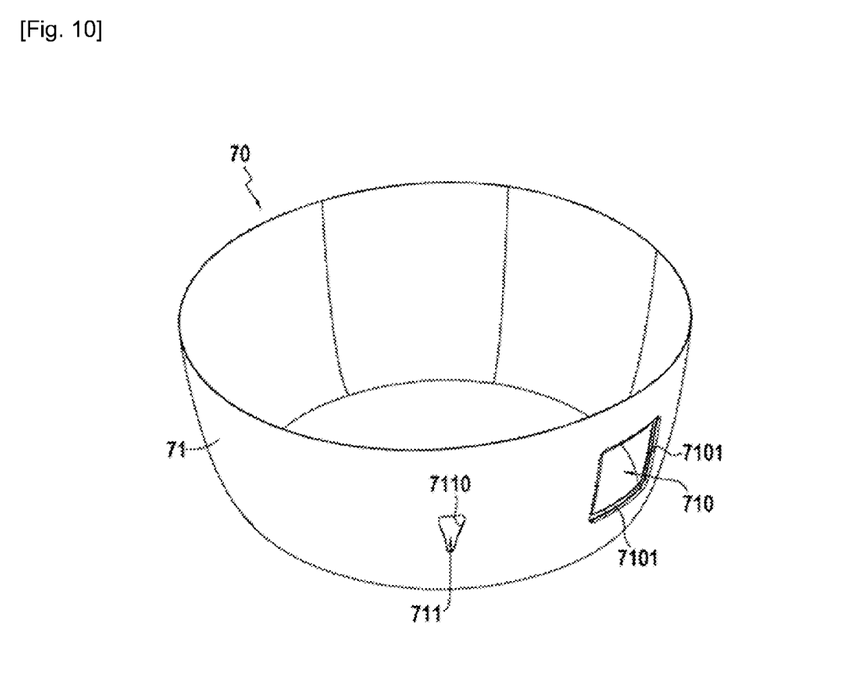
FIG. 10 is a perspective view showing an air intake lip obtained after cutting the openings of FIG. 9.

One thus obtains an air intake lip 70 of revolution shape having in section a U-shape and including an outer wall 71 forming the aerodynamic profile of the lip. The outer wall includes two openings 710 and 711 corresponding to the openings 622 and 632 made in the lip preform 60. The opening 710 includes a plunging 7101 integrally formed with the outer wall 71 and extending entirely under it. The opening 711 includes an inturned edge 7110 integrally formed with the outer wall 71 and extending entirely under it.

For the manufacturing of an air intake lip annular sector in accordance with the method of the invention, steps are implemented similar to the previously described steps S1 to S8 by adapting certain of them to the manufacturing of a sector. For the sake of simplification, not all these steps will be described in detail again. The adaptation of the steps already described consists, in particular, in:

cutting a ring portion in the sheet metal plate (adaptation of step S2);

forming a truncated cone portion (adaptation of step S4);

preforming an air intake lip annular sector blank corresponding to a segment of an air intake lip blank (adaptation of step S5);

forming an air intake lip annular sector preform by hydroforming, adapting the hydroforming tooling and in particular the three-dimensional forming surface of the tooling die to the shape of an annular sector (adaptation of step S6).

Thus, the method of the invention makes it possible to form an air intake lip or an air intake lip sector including one or more openings, the plunged or unplunged edges of which are integrally formed with the structure of the lip or sector.

Figure 11:
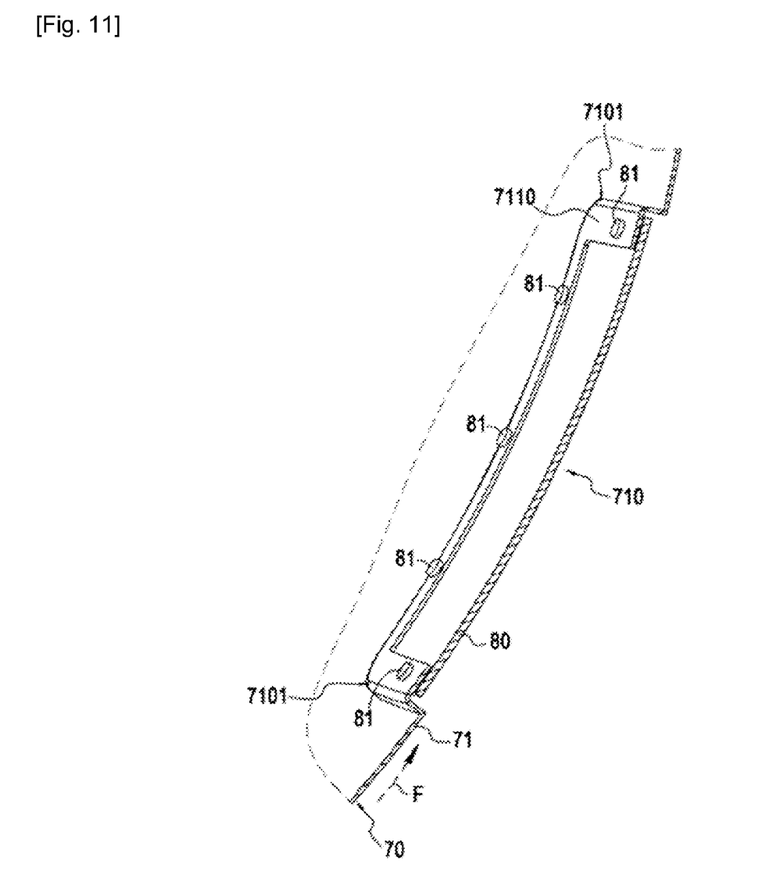
FIG. 11 is a schematic section view showing the fixing of an add-on cover on the air intake lip of FIG. 10.

The opening(s) can particularly, but not exclusively, be used for the fixing of an add-on part which is present under the outer wall of the air intake lip or of the air intake lip annular sector or flush with the outer wall of the air intake lip or of the air intake lip annular sector The method of the invention can consequently further comprise the fixing of one or more add-on parts (step S9). In the example described here and as illustrated in FIG. 11, a first add-on part corresponding to a cover 80 is fixed in the opening 710. More precisely and as illustrated in FIG. 11, the cover 80 is fixed to the plunging 7101 integrally formed with the outer wall 71 by fixing members 81 of screw-nut type. The cover 80 is thus flush with the surface of the outer wall 71 of the air intake lip 70 (the outer surface of the cover 80 is on the same plane as the surface of the outer wall 71). Thus the cover 80 does not disrupt the air flow F along the outer wall 71.

Figure 12:
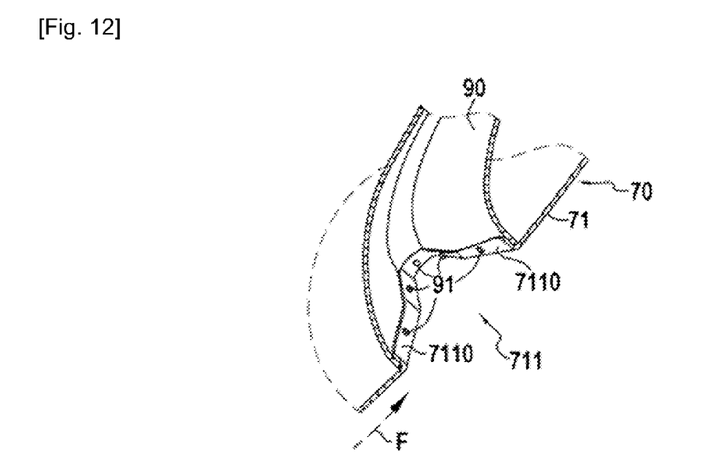
FIG. 12 is a schematic section view showing the fixing of an add-on scoop on the air intake lip of FIG. 10.

A second add-on part, here a scoop 90, is fixed in the opening 711. More precisely, the scoop 90 is fixed to the inturned edge 7110 integrally formed with the outer wall 71 by the fixing members 91 of screw-nut type. Since the scoop 90 and the fixing members 91 extend entirely under the outer wall they cannot disrupt the flow of the air flow F along the outer wall 71.

Furthermore, the presence of fixing edges (plunged or unplunged) integrally formed with the outer wall of the lip or of the annular sector makes it possible to fix an add-on part without having to use a fishplate or an additional mating surface. In this way the overall weight of the air intake lip is reduced.

The invention claimed is:

1. A method for manufacturing a stationary air intake lip or a stationary air intake lip annular sector preform, the method comprising:

arranging a blank facing a three-dimensional forming surface of a die of a hydroforming tool, the three-dimensional forming surface comprising an outer annular portion for forming a one-piece outer wall of the air intake lip or the air intake lip annular sector preform, the outer annular portion comprising at least one cavity protruding through the three-dimensional forming surface, forming the air intake lip or the air intake lip annular sector preform by hydroforming the blank on the three-dimensional forming surface of the die, the air intake lip or the air intake lip annular sector preform having a U-shaped section, the one-piece outer wall of the air intake lip or the air intake lip annular sector preform comprising at least one hollow housing with an inturned edge and a bottom, the inturned edge integrally formed with the outer wall and extending both radially and circumferentially inside the outer wall, and cutting an opening in a predetermined section of the bottom of the at least one hollow housing while keeping at least the inturned edge so as to obtain the air intake lip or the air intake lip annular sector preform.

2. The method according to claim 1, wherein when cutting the opening in the predetermined section of the bottom of the at least one hollow housing, all or only a part of the inturned edge is kept.

3. The method according to claim 2, wherein an add-on part is fixed to the inturned edge at the opening, said add-on part positioned radially inside the outer wall of the air intake lip or the air intake lip annular sector preform.

4. The method according to claim 3, wherein the add-on part is a scoop.

5. The method according to claim 1, wherein when cutting the opening in the predetermined section of the bottom of the at least one hollow housing, a portion of the bottom is kept so as to form a plunging at the opening, the method further comprising fixing an add-on part to the portion of the bottom, said add-on part being positioned radially inside the outer wall of the air intake lip or the air intake lip annular sector preform or flush with the outer wall of the air intake lip or the air intake lip annular sector preform.

6. The method according to claim 1, wherein each cavity is configured to receive a removable key.

7. A stationary air intake lip or a stationary air intake lip annular sector, the air intake lip or the air intake lip annular sector having a U-shaped section and comprising: a one-piece outer wall comprising one or more openings, each opening of the one or more openings including at least one inturned edge integrally formed with the outer wall and extending both radially and circumferentially inside the outer wall, and wherein an add-on part is fixed to the at least one inturned edge of the one or more openings of the outer wall, the add-on part positioned radially inside the outer wall of the air intake lip or the air intake lip annular sector.

8. The air intake lip or air intake lip annular sector according to claim 7, wherein the add-on part is a scoop.

9. The air intake lip or air intake lip annular sector according to claim 7, wherein the add-on part is fixed to the at least one inturned edge of the one or more openings such that relative movement between the add-on part and the at least one inturned edge is prevented.

* * * * *